US012588101B2

(12) United States Patent
Hong

(10) Patent No.: US 12,588,101 B2
(45) Date of Patent: Mar. 24, 2026

(54) METHOD FOR CONTROLLING SIDELINK COMMUNICATION AND DEVICE THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 409 days.

(21) Appl. No.: 17/917,803

(22) PCT Filed: Apr. 1, 2021

(86) PCT No.: PCT/KR2021/004094

§ 371 (c)(1),
(2) Date: Oct. 7, 2022

(87) PCT Pub. No.: WO2021/206371

PCT Pub. Date: Oct. 14, 2021

(65) Prior Publication Data

US 2023/0138737 A1    May 4, 2023

(30) Foreign Application Priority Data

Apr. 7, 2020    (KR) ........................ 10-2020-0042124
Mar. 29, 2021    (KR) ........................ 10-2021-0040116

(51) Int. Cl.
*H04W 76/28*          (2018.01)
(52) U.S. Cl.
CPC .................................. *H04W 76/28* (2018.02)
(58) Field of Classification Search
None
See application file for complete search history.

(56) References Cited

U.S. PATENT DOCUMENTS

| | | | | |
|---|---|---|---|---|
| 11,968,736 B2 * | 4/2024 | Dutta | ................ | H04W 52/0216 |
| 2019/0053305 A1 | 2/2019 | Saiwai et al. | | |

(Continued)

FOREIGN PATENT DOCUMENTS

| | | |
|---|---|---|
| EP | 3500028 A1 | 6/2019 |
| KR | 10-2019-0039101 A | 4/2019 |

(Continued)

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.0.0 (Mar. 2020), pp. 1-835.

(Continued)

*Primary Examiner* — Gregory B Sefcheck
*Assistant Examiner* — Benjamin Peter Welte
(74) *Attorney, Agent, or Firm* — IP Legal Services, LLC

(57)                    ABSTRACT

Provided are a method and a device for performing sidelink communication by a terminal. The method may include: receiving, from a base station or other terminals, configuration information for controlling transmission of sidelink discontinuous reception (DRX) parameter preference information; configuring an operation of the transmission of the sidelink DRX parameter preference information on the basis of the configuration information; and transmitting the sidelink DRX parameter preference information to the base station or other terminals on the basis of the configuration information.

12 Claims, 12 Drawing Sheets

(56)             References Cited

U.S. PATENT DOCUMENTS

| | | | | |
|---|---|---|---|---|
| 2019/0174411 A1* | 6/2019 | Xu | ......................... | H04W 72/12 |
| 2020/0045768 A1 | 2/2020 | He et al. | | |
| 2020/0296668 A1 | 9/2020 | Xu et al. | | |
| 2021/0227621 A1* | 7/2021 | Pan | ....................... | H04W 76/28 |
| 2021/0243754 A1* | 8/2021 | Zhao | ..................... | H04W 92/18 |
| 2021/0385710 A1 | 12/2021 | Jin et al. | | |
| 2022/0167268 A1 | 5/2022 | Xu et al. | | |
| 2022/0353815 A1* | 11/2022 | Lin | ....................... | H04W 76/28 |
| 2023/0014303 A1* | 1/2023 | Di Girolamo | ........ | H04W 76/28 |
| 2023/0059876 A1* | 2/2023 | Li | ......................... | H04W 76/28 |

FOREIGN PATENT DOCUMENTS

| | | | |
|---|---|---|---|
| WO | 2018/064477 A1 | 4/2018 | |
| WO | 2020/060254 A1 | 3/2020 | |

OTHER PUBLICATIONS

Ericsson, "[108#28][R16 RRC] 38331 Rel-16 CR Merge", R2-20xxxxx, 3GPP TSG-RAN WG2 Meeting #109, Athens, Greece, Feb. 24-28, 2020, pp. 1-794.
European Patent Office, Extended European Search Report of corresponding EP Patent Application No. 21784267.3, Sep. 27, 2024.
ZTE, "Discussion on the system information delivery", R2-1704637, 3GPP TSG RAN WG2 #98, Hangzhou, China, May 15-19, 2017.
Korean Intellectual Property Office, Office Action of corresponding KR Patent Application No. 10-2021-0040116, Sep. 5, 2025.

* cited by examiner

One subframe

Resource grid, 2deltaf

Resource grid, deltaf

Carrier bandwidth

One resource block-12 subcarriers,
subcarrier spacing 2deltaf

One resource block-12 subcarriers,
subcarrier spacing 2deltaf

CORESET #4

CORESET #3

CORESET #2

CORESET #1 one slot

METHOD FOR CONTROLLING SIDELINK COMMUNICATION AND DEVICE THEREFOR

CROSS REFERENCE TO RELATED APPLICATIONS

This application is a National Stage Patent Application of PCT International Patent Application No. PCT/KR2021/004094 (filed on Apr. 1, 2021) under 35 U.S.C. § 371, which claims priority to Korean Patent Application Nos. 10-2020-0042124 (filed on Apr. 7, 2020) and 10-2021-0040116 (filed on Mar. 29, 2021), the teachings of which are incorporated herein in their entireties by reference.

TECHNICAL FIELD

The present disclosure relates to controlling sidelink communication.

BACKGROUND ART

There is demand for developing technology for processing a large amount of data at a high speed for providing various services using wireless terminals in vehicles and industrial sites. Further, it is required to develop a technology for a communication system capable of processing various scenarios and large-volume data, such as video, wireless data, and machine-type communication data, beyond a simple voice-oriented service.

To this end, the international telecommunication union radio communication sector (ITU-R) introduces the requirements for adopting the international mobile telecommunications (IMT)-2020 international standard, and many studies have been conducted for advancing next-generation wireless communication technology to meet the requirements of IMT-2020.

In particular, the $3^{rd}$ generation partnership project (3GPP) is conducting research on the long term evolution (LTE)-advanced Pro Rel-15/16 standards and the new radio access technology (NR) standard in parallel to meet the requirements for IMT-2020 called $5^{th}$ generation (5G) technology, and 3GPP has a plan to approve the two standards as next-generation wireless communication technology.

Such 5G technology may be applied and utilized in autonomous vehicles. For this, it is necessary to apply the 5G technology to sidelink communication (e.g., vehicle communication (V2X)), and autonomous driving requires high speed data transmission and reception while guaranteeing high reliability.

Further, to meet driving scenarios of various autonomous vehicles, such as platooning, it is required to ensure various types of data communication, such as multicast data transmission/reception as well as multiple unicast data transmissions/receptions using sidelink communication.

UE performing sidelink communication should continuously monitor control data or user data in the sidelink radio resource to identify whether sidelink communication data is received. Such operation may cause significant power consumption.

DETAILED DESCRIPTION OF THE INVENTION

Technical Problem

The present disclosure introduces a method and device for preventing a drastic increase in power consumption that may occur during sidelink communication.

Technical Solution

In an aspect, a method may be provided for performing sidelink communication by a UE. The method may include receiving configuration information for controlling transmission of sidelink discontinuous reception (DRX) parameter preference information from a base station or another UE, configuring a transmission operation of the sidelink DRX parameter preference information based on the configuration information, and transmitting the sidelink DRX parameter preference information to the base station or the other UE based on the configuration information.

In another aspect, a method may be provided for controlling sidelink communication of a UE by a base station. The method may include transmitting configuration information for controlling transmission of sidelink discontinuous reception (DRX) parameter preference information to the UE, receiving the sidelink DRX parameter preference information from the UE, and transmitting sidelink DRX configuration information including sidelink DRX parameter information to be used for the UE's sidelink communication based on the sidelink DRX parameter preference information.

In still another aspect, a UE may be provided for performing sidelink communication. The UE may include a receiver receiving configuration information for controlling transmission of sidelink discontinuous reception (DRX) parameter preference information from a base station or another UE, a controller configuring a transmission operation of the sidelink DRX parameter preference information based on the configuration information, and a transmitter transmitting the sidelink DRX parameter preference information to the base station or the other UE based on the configuration information.

In yet another aspect, a base station may be provided for controlling sidelink communication of a UE. The UE may include a transmitter transmitting configuration information for controlling transmission of sidelink discontinuous reception (DRX) parameter preference information to the UE and a receiver receiving the sidelink DRX parameter preference information from the UE, wherein the transmitter further transmits sidelink DRX configuration information including sidelink DRX parameter information to be used for the UE's sidelink communication, based on the sidelink DRX parameter preference information.

Advantageous Effects

The present embodiments may prevent a drastic increase in power consumption that may occur during sidelink communication.

MODE FOR CARRYING OUT THE INVENTION

Figure 1:
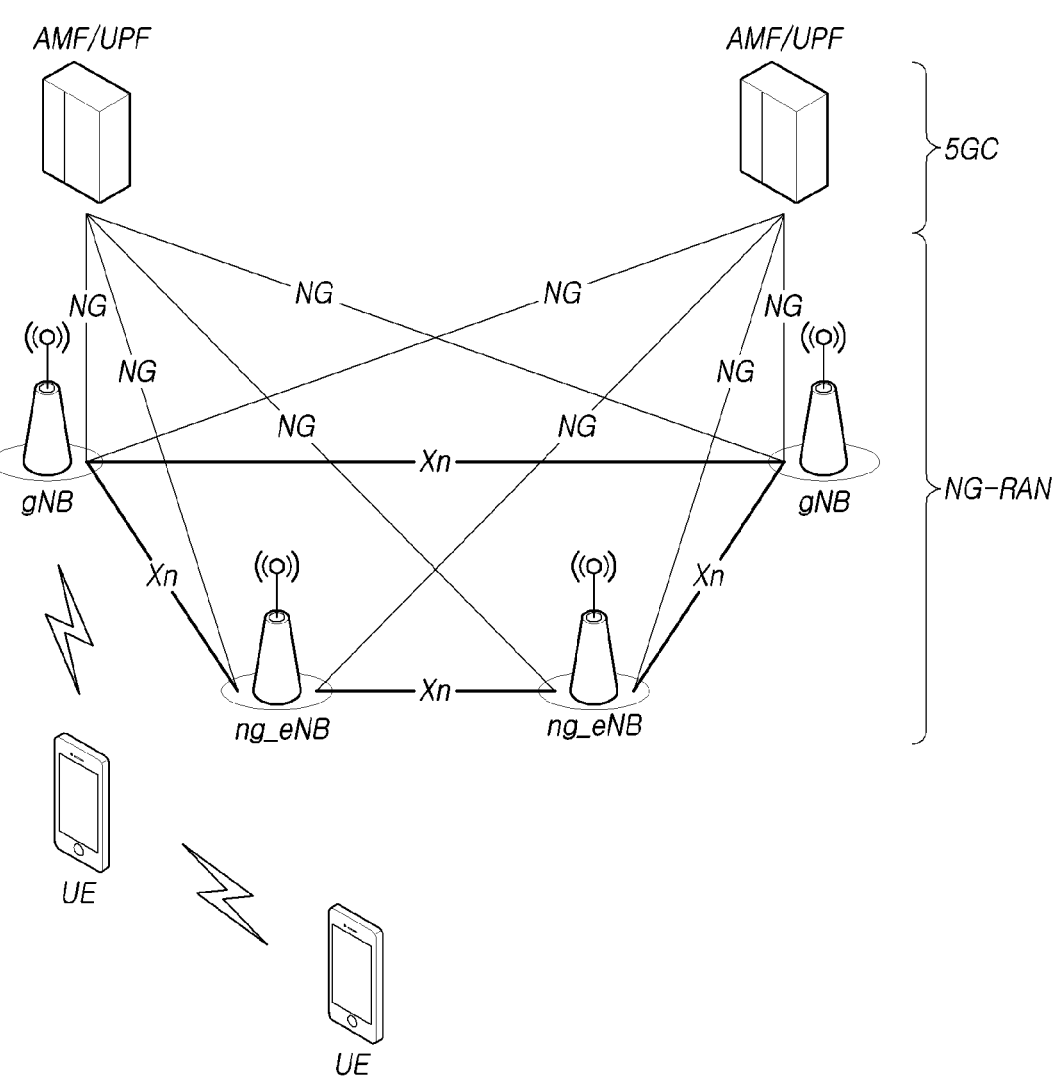
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
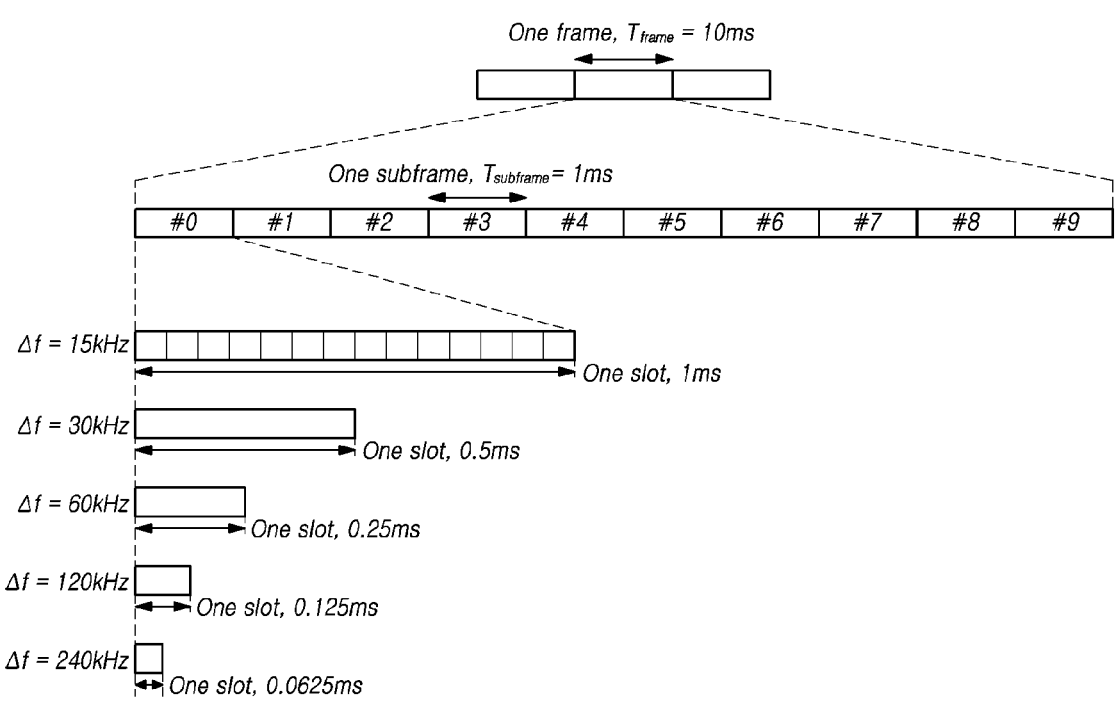
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-colocation (QC/QCL) relationship. The large-scale properties include at least one of delay spread, Doppler spread, a frequency shift, an average received power, and a received timing.

Figure 3:
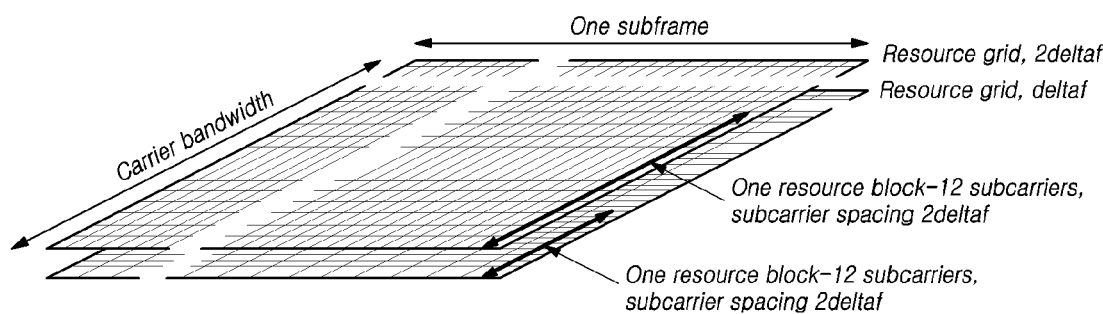
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
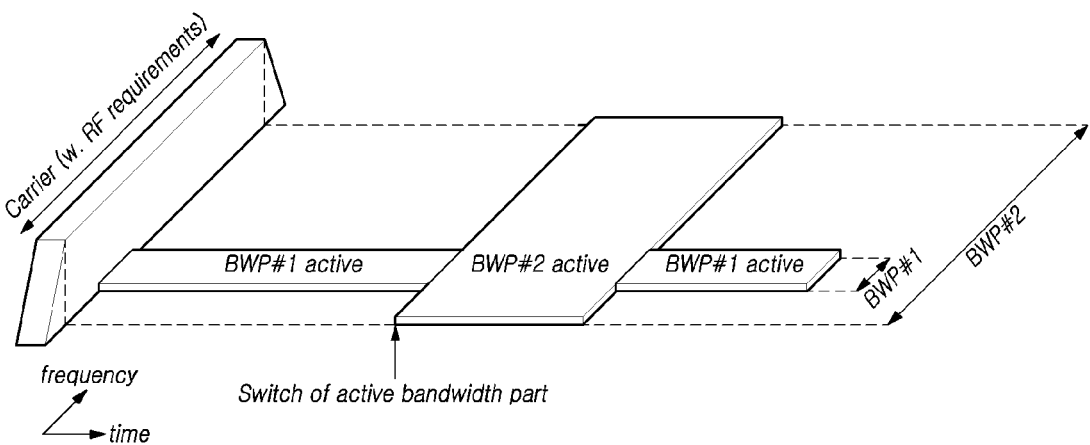
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
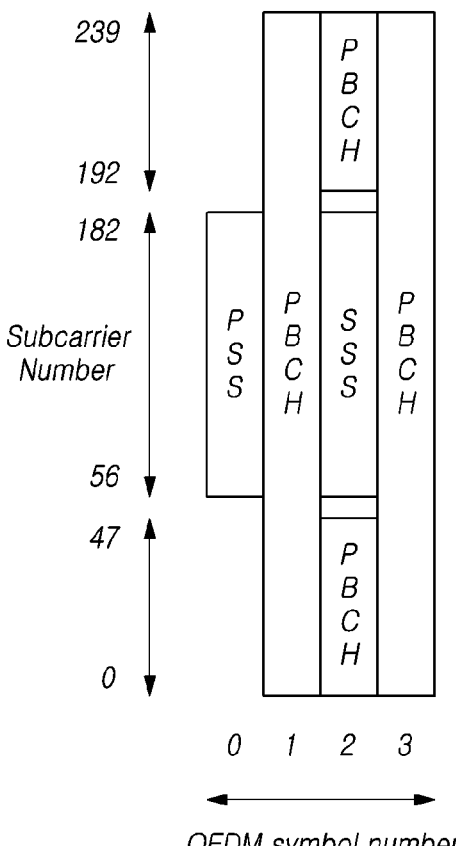
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
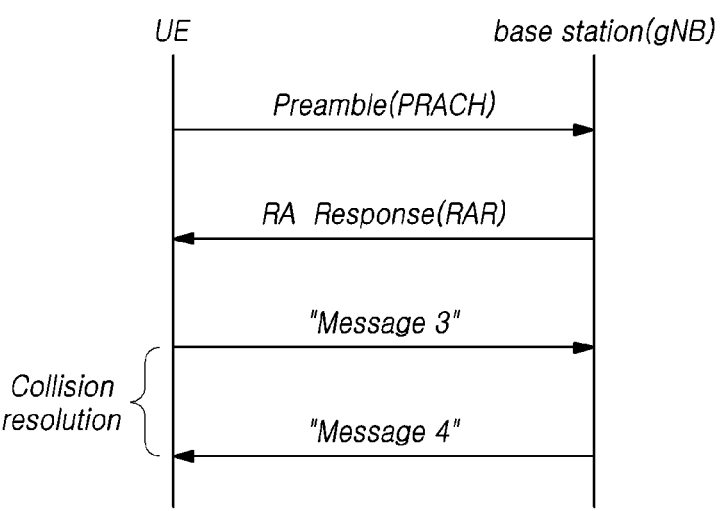
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
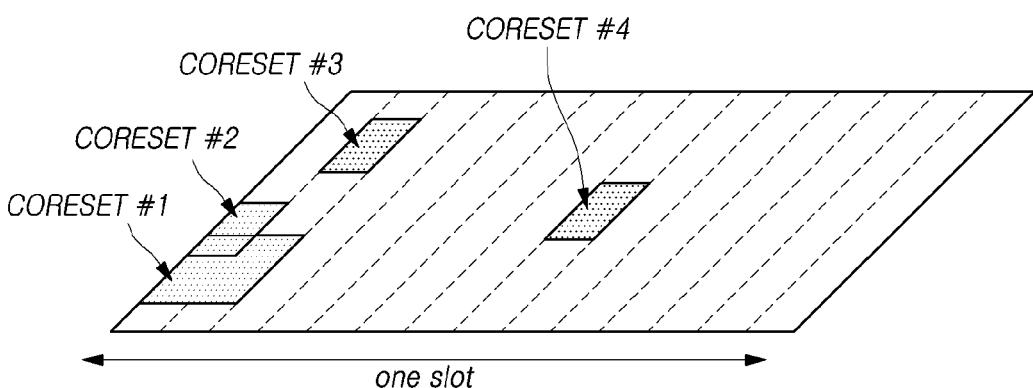
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

NR is designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low latency communication (URLLC) are defined as representative usage scenarios of the NR. To meet requirements for each usage scenario, NR is designed to have more flexible frame structure as compared to the LTE/LTE-Advanced. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on time division multiplexing (TDM), frequency division multiplexing (FDM), or TDM/FDM over one NR carrier, and ii) methods of supporting one or more time units in configuring a scheduling unit in the time domain. In this regard, in NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of NR has the time duration of 1 ms. Unlike LTE, since the subframe of NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation. Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot may be defined to be made up of fewer OFDM symbols than the slot. Thus the scheduling for the latency critical data, such as the URLLC, may be performed based on the mini-slot.

Meanwhile, in NR, the default scheduling unit has been changed to a slot. Further, regardless of subcarrier-spacing, the slot consists of 14 OFDM symbols. In contrast, NR supports a non-slot structure configured of 2, 4, or 7 OFDM symbols, which is a smaller scheduling unit. The non-slot structure may be utilized as a scheduling unit for URLLC service.

<LTE V2X Communication>

In the typical LTE system, for direct communication between UEs and providing a vehicle to everything (V2X) service, particularly a vehicle to vehicle V2V service, a radio channel and radio protocol have been designed for inter-UE direct communication (i.e., sidelink).

In relation to the sidelink, PSS/SSS and physical sidelink broadcasting channel (PSBCH) are defined. PSS/SSS is a synchronization signal for synchronization between a wireless sidelink transmitting end and a receiving end, and PSBCH is a channel for transmitting and receiving a sidelink master information block (MIB) related thereto. Also, physical sidelink discovery channel (PSDCH), physical sidelink control channel (PSCCH) for sidelink control information (SCI) transmission/reception, and physical sidelink shared channel (PSSCH) have been designed.

Further, to allocate a radio resource for sidelink, mode 1 and mode 2 have been developed separately. In the mode 1, the base station allocates a radio resource. In the mode 2, the UE selects and allocates one from a radio resource pool. Further, the LTE system required an additional technical evolution to meet the V2X scenario.

By giving the vehicle access to a mobile communication network (e.g., LTE/LTE-A), the vehicle may be connected to the Internet and to other vehicles. V2X (Vehicle to Everything) communication includes the following four types.

V2V (Vehicle to Vehicle) Communication: Communication between vehicles

V2I (Vehicle to Infrastructure) Communication: Communication between vehicle and infrastructure V2N (Vehicle to Network) Communication: Communication between vehicle and network V2P (Vehicle to Pedestrian) Communication: Communication between vehicle and pedestrian FIG. 8 is a view illustrating an exemplary architecture of a V2X communication system in an LTE system.

Figure 8:
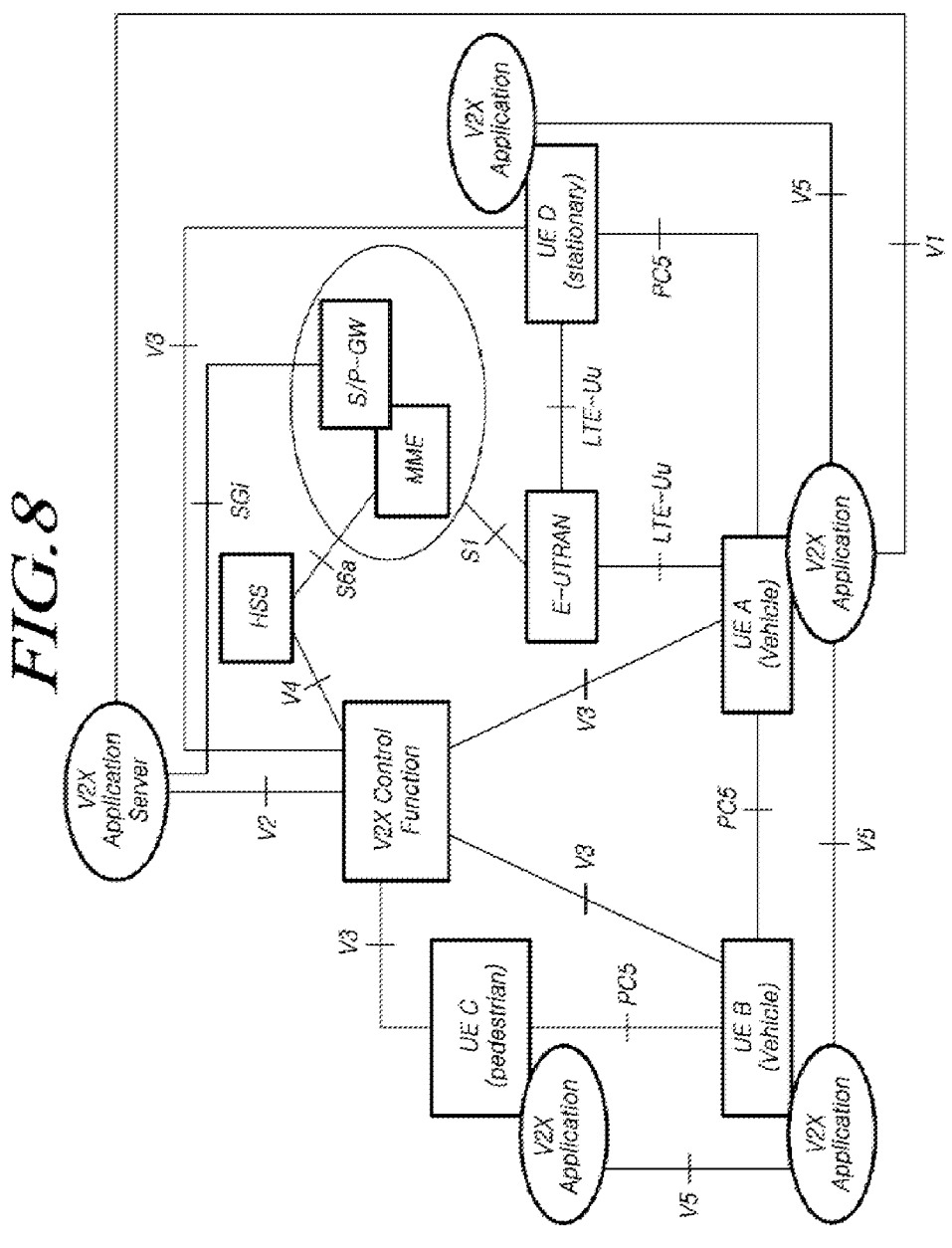
FIG. 8 is a view illustrating an example architecture of a V2X communication system in an LTE system.

Referring to FIG. 8, a V2X service may be provided through a PC5 interface and/or Uu interface. Support via the PC5 interface was provided via V2X sidelink communication.

Specifically, various V2X communication UEs (UEs A to D) are linked through the PC5 interface, and the V2X communication UE and the V2X control function are linked through the V3 interface. Further, the V2X application server and the V2X application of each V2X communication UE are linked through the V1 interface. The V2X communication UE is linked with the base station (E-UTRAN) through the Uu interface, and the base station is linked with the core network (MME and S/P GW) through the S1 interface. The MME and S/P GW are linked with the HSS through the S6a interface, and the HSS is linked with the V2X control function through the V4 interface. The core network entity is linked with the V2X application server through the SGi interface. Meanwhile, the respective V2X applications of the V2X communication UEs are linked to each other through the V5 interface.

Sidelink refers to the PC5 interface specified in 3GPP TS 23.303, as an interface between UEs.

In the typical LTE system, resource allocation by the UE supporting sidelink communication supported the following modes.

Scheduled resource allocation: it requires RRC connection for data transmission. The UE requests transmission resource allocation from the base station, and the base station allocates a transmission resource for transmission of sidelink control information and data. The UE transmits a scheduling request and following sidelink BSR to the base station. The base station schedules a transmission resource for sidelink communication using a configured SL-RNTI. For convenience of description, the resource allocation mode that enables the base station to allocate a sidelink resource is referred to as a first mode. This is merely for convenience of description and may be replaced with other names (sidelink Mode 1 for D2D, sidelink Mode 3 for V2X).

UE autonomous resource allocation: the UE itself selects a resource from a pre-configured sidelink resource pool and selects a transmission format for transmission of sidelink control information and data. If a resource pool is selected, the selection is effective during the overall sidelink control period. If the period ends, the UE may reselect a resource pool. For convenience of description, the resource allocation mode that enables the UE to select a sidelink resource according to a predetermined criterion from the sidelink resource pool is referred to as a second mode (sidelink Mode 2 for D2D, sidelink Mode 4 for V2X). This is for ease of description, and it may be replaced with another term.

In D2D communication such as public safety, both the modes (mode 1 and mode 2) share the same resource allocation structure. Data transmission is scheduled in a PSCCH period. A set of subframes in this period is used for physical sidelink control channel (PSCCH) transmission. Another set of subframes is used for PSSCH transmission. The PSCCH including scheduling control information for one corresponding physical sidelink shared channel (PSSCH) is transmitted always before PSSCH data.

V2X communication uses a resource allocation structure totally different from the two modes (mode 1 and mode 2) of D2D communication to allocate PSCCH and PSSCH in two modes (mode 3 and mode 4). First, there is no PSCCH period to allow two physical channels (PSCCH and PSSCH) to be distributed and transmitted in different periods. The PSCCH and the PSSCH are separated in the frequency domain. In SCI format 1, PSSCH transport blocks corresponding to two identical SCIs may be transmitted in the same subframe. The transport block may be transmitted once or twice. When transmitted twice, the receiver provides combining for the redundancy version of the PSSCH transport block.

For sidelink communication when the UE is out of coverage, one set of transmission/reception resource pools for sidelink control information may be preconfigured in the UE. One set of transmission/reception resource pools for sidelink data information may be preconfigured in the UE. To be able to perform sidelink communication even when some UEs are in coverage while some UEs are out of coverage, all the UEs should be configured with a resource pool for reception sidelink control information with a union of all used resource pools to transmit sidelink control information from the serving cell, neighbor cell, and out-of-coverage (i.e., pre-configured transmission resource pools). Accordingly, the UE's power consumption increases to receive sidelink control information.

NR V2X

3GPP has approved the NR V2X items to support advanced V2X services, such as vehicles platooning, extended sensors, advanced driving, and remote driving based on NR in Rel-16. NR V2X is not intended to replace the service provided by LTE V2X and assumes to supplement LTE V2X for enhanced V2X service and support interworking with LTE V2X. Accordingly, unlike LTE V2X, which provides broadcast-based V2X basic service, NR V2X includes support for unicast mode and groupcast mode.

The NR V2X resource allocation scheme may support i) the first mode in which the base station performs scheduling for communication resources between UEs and ii) the second mode in which the UE autonomously selects resources from the resource pool. To transmit data in the first mode, the UE must be in an RRC connection state, and the base station may dynamically allocate resources to the UE through a sidelink-RNTI (SL-RNTI) on the PDCCH. Further, the base station may allocate sidelink resources to the UE with two configured sidelink grants.

With type 1, RRC directly provides the configured sidelink grant only for NR sidelink communication.

With type 2, RRC defines the periodicity of the configured sidelink grant while PDCCH can either signal and activate the configured sidelink grant or deactivate it. PDCCH is addressed to SL-CS-RNTI for NR sidelink communication and SL Semi-Persistent Scheduling V-RNTI for V2X sidelink communication.

In the second mode, when the UE is in coverage of the base station (NG-RAN), the UE may transmit data regardless of the RRC state of the UE. Further, in the second mode, the UE may transmit data when the UE is out of coverage of the base station. The UE may autonomously select a transmission resource from a pool of resources. The resource pool may be provided by broadcast system information or dedicated signaling when in coverage of the base station or by preconfiguration when out of coverage of the base station.

Even in NR V2X communication, the receiving UE has a burden of continuously monitoring the sidelink reception resource pool in all resource pools for sidelink communication. As a method to address this issue, application of the DRX function on the sidelink may be considered. However, no specific method has been provided for this. Further, in particular, UEs performing sidelink communication may have difficulty in aligning and using the sidelink DRXs between UEs in various UE states, such as the RRC connected state in base station coverage, in the RRC idle/RRC inactive state, in coverage of different base stations, or out of base station coverage, and is unable to address a parameter mismatch that may occur between UEs.

Although the DRX function is applied to sidelink communication, when the UE performs sidelink communication with one or more UEs, it is difficult to effectively align and use the corresponding function between the UEs. Further, in the mode scheduled by the base station, the transmitting UE should receive a scheduling (e.g., sidelink grant) for sidelink communication from the base station. In this case, no method has been provided for power-efficiently receiving the sidelink grant.

In typical V2X communication technology, all the UEs are configured with a resource pool for reception sidelink control information with a union of used resource pools to transmit sidelink control information from the serving cell, neighbor cell, and out-of-coverage. The receiving UE had to continuously monitor sidelink control information in the resource pool for all receiving sidelink control information for sidelink communication. Accordingly, the power consumption of the UE increases. Further, when the UE performs sidelink communication with one or more UEs, it is difficult to effectively coordinate and use information between the UEs.

The present disclosure devised to address these issues introduces a method and device for power-efficiently transmitting and receiving data by a sidelink communication UE. As an example, there is provided a control method for effectively aligning and using DRX on-off times between UEs.

The following embodiments in the present disclosure may be applied to sidelink communication between an NR UE and an NR UE through an NR base station. Of course, the following embodiments may be applied to sidelink communication between an NR UE and an LTE UE through an NR base station. Or, the following embodiments may also be applied to sidelink communication between an LTE UE and an LTE UE through an NR base station. Or, the following embodiments may also be applied to sidelink communication between an LTE UE and an LTE UE through an LTE base station. Or, the following embodiments may also be applied to sidelink communication between an LTE UE and an NR UE through an LTE base station. Or, the following embodiments may also be applied to sidelink communication between an NR UE and an NR UE through an LTE base station.

Meanwhile, the following embodiments may be applied to LTE UEs connected to an eLTE base station connected through a 5G system (or 5G core network). Or, the following embodiments may also be applied to E-UTRAN NR dual connectivity (EN-DC) UEs or NR E-UTRAN dual connectivity (NE-DC) UEs simultaneously providing LTE and NR wireless connections.

Any base station among the master base station or the secondary base stations may indicate configuration information for sidelink communication. For convenience of description, the following description focuses mainly on unicast V2X communication. This is merely for convenience of description, and the embodiments in the present disclosure are likewise applicable to groupcast or broadcast schemes. Further, the embodiments in the present disclosure may also be applied to any sidelink-based application (e.g., public safety, IoT, or commercial D2D) as well as sidelink-based V2X communication. For example, the embodiments in the present disclosure may be applied to UEs having any capability related to sidelink as well as V2X capable UEs and V2P capable UEs.

In the disclosure, UE means a device capable of performing sidelink communication. Base station may mean a transmission/reception point that has an RRC connection with the UE. Further, another UE means another UE for performing sidelink communication with the UE serving as the reference for description in the disclosure, and there is no limitation on the term. In other words, another UE may be described as a peer UE in that it performs sidelink communication with the reference UE. It may also be described with other various terms.

Figure 9:
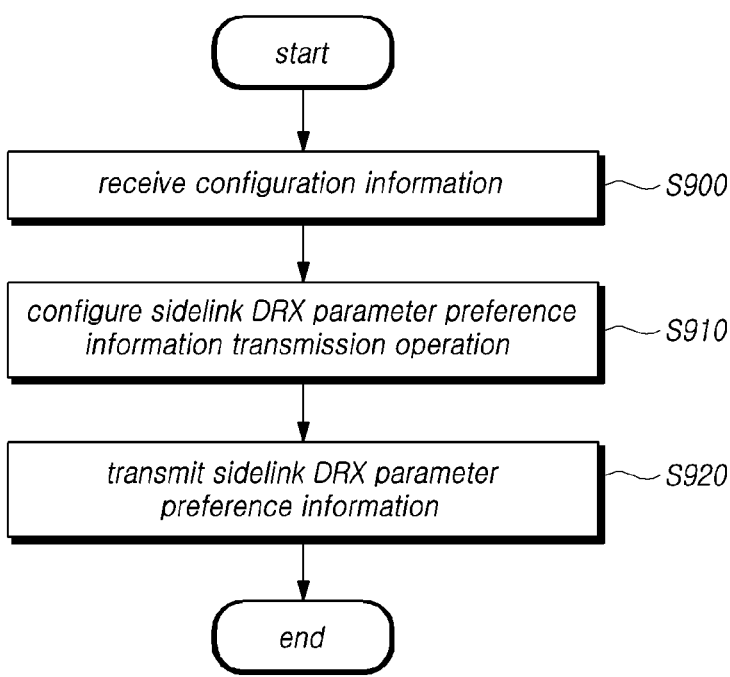
FIG. 9 is a flowchart for describing operations of a UE according to an embodiment.

FIG. 9 is a flowchart for describing operations of a UE according to an embodiment.

Referring to FIG. 9, the UE may perform the step of receiving configuration information for controlling transmission of sidelink discontinuous reception (DRX) parameter preference information from a base station or another UE (S900).

The UE may receive various messages from a base station or another UE performing sidelink communication. The received message may be received through various channels, e.g., through a Uu interface in the case of the base station and through a sidelink interface (e.g., PC5) in the case of another UE.

According to an embodiment, the configuration information may include information for configuring transmission of preference information about the sidelink DRX parameter preferred by the UE when the UE performs a sidelink DRX operation. For example, the configuration information may include preference prohibit timer information about sidelink DRX parameter preference information transmission. Or, the configuration information may include various pieces of information, such as trigger condition information used for the UE to transmit sidelink DRX parameter preference information, type of information to be included in the sidelink DRX parameter preference information, and information as to whether sidelink DRX parameter preference information transmission is activated.

The UE may perform the step of configuring a transmission operation of the sidelink DRX parameter preference information based on the configuration information (S910).

For example, the UE configures the received configuration information in the UE. As an example, the UE may configure a preference prohibit timer for sidelink DRX parameter preference information transmission included in the configuration information, in the UE.

Further, the UE may set the preference prohibit timer to initiate when the sidelink DRX parameter preference information selected by the UE differs from the sidelink DRX parameter preference information included in the most recently transmitted RRC message, and the sidelink preference prohibit timer configured in the UE does not operate.

For example, the UE may transmit an RRC message to the base station or the other UE. In this case, the RRC message may include sidelink DRX parameter preference information. Thereafter, the UE determines whether the sidelink DRX parameter preference information transmitted through the RRC message is changed for any reason of the UE. If the sidelink DRX parameter preference information transmitted most recently by the UE and the sidelink DRX parameter preference information currently selected by the UE have been changed, the UE determines whether the preference prohibit timer is operating. When the preference prohibit timer is not operating, the UE may initiate the preference prohibit timer received through the configuration information.

The UE may perform the step of transmitting sidelink DRX parameter preference information to the base station or the other UE (S920).

For example, if a transmission trigger in the UE, configured based on the configuration information, occurs, the UE may transmit sidelink DRX parameter preference information to the base station or another UE. In this case, the sidelink DRX parameter preference information may be transmitted through a sidelink UE information RRC message or UE assistance information RRC message.

For example, the sidelink DRX parameter preference information may include at least one of the UE's preference sidelink DRX cycle information, preference sidelink DRX inactivity timer information, and preference sidelink DRX on-duration timer information. The sidelink DRX parameter preference information may further include other various preference parameter information described in the disclosure.

Through the above-described operations, the UE may stably apply the DRX operation in sidelink communication. Further, the UE may perform an inter-UE sidelink DRX aligning operation and may facilitate application of the sidelink DRX parameter according to a change in the UE's context.

Figure 10:
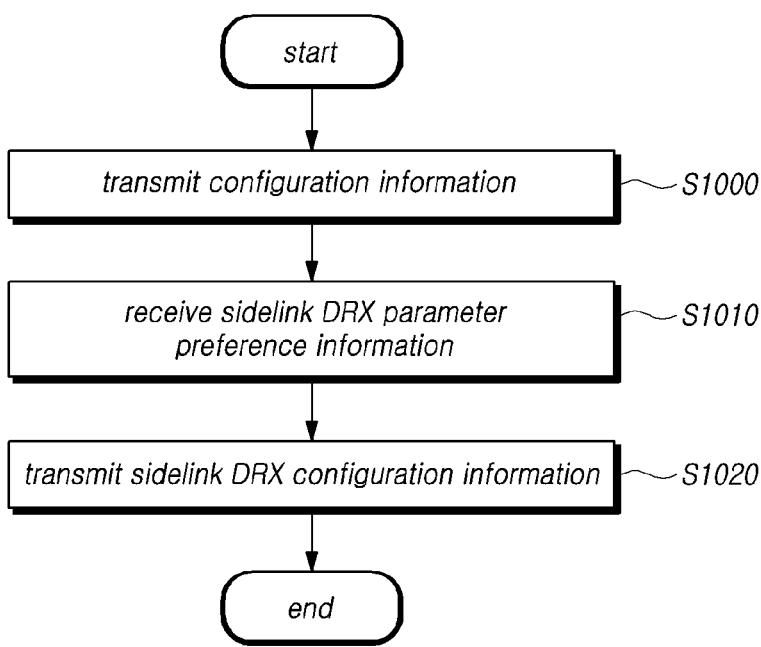
FIG. 10 is a flowchart for describing operations of a base station according to an embodiment.

FIG. 10 is a flowchart for describing operations of a base station according to an embodiment.

Referring to FIG. 10, the base station may perform the step of transmitting configuration information for controlling transmission of a sidelink discontinuous reception (DRX) parameter preference information to the UE (S1000).

According to an embodiment, the configuration information may include information for configuring transmission of preference information about the sidelink DRX parameter preferred by the UE when the UE performs a sidelink DRX operation. For example, the configuration information may include preference prohibit timer information about sidelink DRX parameter preference information transmission. Or, the configuration information may include various pieces of information, such as trigger condition information used for the UE to transmit sidelink DRX parameter preference information, type of information to be included in the sidelink DRX parameter preference information, and information as to whether sidelink DRX parameter preference information transmission is activated.

The UE configures the received configuration information in the UE. According to an embodiment, the UE may configure a preference prohibit timer for sidelink DRX parameter preference information transmission included in the configuration information, in the UE.

Further, the UE may set the preference prohibit timer to initiate when the sidelink DRX parameter preference information selected by the UE differs from the sidelink DRX parameter preference information included in the most recently transmitted RRC message, and the sidelink preference prohibit timer configured in the UE does not operate.

The base station may perform the step of receiving sidelink DRX parameter preference information from the UE (S1010).

The UE may transmit the sidelink DRX parameter preference information to the base station based on the configured configuration information. As described above, the UE may also transmit sidelink DRX parameter preference information to another UE performing sidelink communication.

For example, the sidelink DRX parameter preference information may be received through a sidelink UE information RRC message or UE assistance information RRC message. For example, the sidelink DRX parameter preference information may include at least one of the UE's preference sidelink DRX cycle information, preference sidelink DRX inactivity timer information, and preference sidelink DRX on-duration timer information. The sidelink DRX parameter preference information may further include other various preference parameter information described in the disclosure.

The base station may perform the step of transmitting the sidelink DRX configuration information including the sidelink DRX parameter information to be used for the UE's sidelink communication based on the sidelink DRX parameter preference information (S1020).

For example, the base station may transmit the sidelink DRX configuration information to perform a DRX operation in the sidelink communication. The sidelink DRX configuration information may include various sidelink DRX parameter information necessary for the UE to perform the DRX operation in the sidelink communication. The sidelink DRX configuration information may include two or more sidelink DRX parameter sets. In this case, the sidelink DRX configuration information may include index information for distinguishing the sidelink DRX parameter sets.

For example, the sidelink DRX parameter may be configured in association with one or more of a PC5 unicast link, a PC5-RRC connection, a logical connection for a pair of source L2 ID and destination L2 ID, a sidelink radio bearer, and a sidelink RLC bearer.

Through the above-described operations, the base station may control the UE's sidelink DRX operation and may also control the transmission operation of the sidelink DRX parameter preference information preferred by the UE.

Hereinafter, various embodiments that may be applied to the above-described operations of the UE, another UE, and base station will be separately described in greater detail. The embodiments described below may be practiced individually or in combination. In the following, to more clearly describe 'another UE' described above, the 'another UE' is described as a peer UE which may be understood as having the same meaning as 'another UE.' Further, the above-described sidelink DRX parameter preference information may be described below as sidelink communication preference DRX parameter, interest information, preference information, or preference DRX parameter information.

An Embodiment in which the UE Interested in Sidelink Communication Transmits Sidelink DRX Parameter Preference Information to the Base Station When one or more UEs interested in sidelink communication are in base station coverage, e.g., when the UEs are in the same cell coverage associated with one base station, it is required to optimally allocate radio resources. To that end, it is preferable that the base station receives interest information about specific sidelink communication (e.g., V2X sidelink communication) (or about any sidelink communication) and/or transmission resource request information about the UE from the sidelink communication-interested UE(s).

For example, a sidelink UE information RRC message may be used to transmit the interest information or request information. The interest information or request information may include at least one piece of information of interested frequency index list information (sl-RxInterestedFreqList) in receiving NR sidelink communication, cast type corresponding to the destination for requesting the transmission resource (sl-CastType), destination identifier for requesting the transmission resource (sl-DestinationIdentity), sidelink RLF information about the associated destination when sidelink radio link failure is detected (sl-Failure), QoS profile of sidelink QoS flow (sl-QoS-InfoList), unique sidelink QoS flow identifier for different destinations and cast types (sl-QoS-FlowIdentity), RLC mode for sidelink radio bearer (sl-RLC-ModeIndication), and interested frequency index list information in transmitting NR sidelink communication and sidelink sync reference list used by the UE (sl-TypeTxSyncList)

It is preferable that when one or more UEs interested in sidelink communication are in a same base station coverage, e.g., when the UEs are in the same cell coverage associated with one base station, the corresponding base station receives information for configuring/indicating/supporting power efficient sidelink communication between the UEs interested in sidelink communication. A sidelink UE information message may be used for transmitting the information.

As an example, to transmit the information, a sidelink UE information message (sidelink UE information NR RRC message) that may be used to transmit the sidelink transmission resource request information about the UE and/or interest information about the sidelink communication on the PC5 interface between UEs may be used. The information may include the UE's sidelink DRX parameter preference information (sidelink preference DRX parameter) for sidelink communication discontinuous reception (DRX) on the PC5 interface between UEs.

As another example, to transmit the information, UE assistance information RRC message that may be used to transmit preference information for power savings on the Uu interface between the UE and the base station may be used. The information may include the UE's sidelink DRX parameter preference information for sidelink communication discontinuous reception (DRX) on the PC5 interface between UEs. By using the message, the base station may prevent the UE from continuously transmitting the information.

As another example, when successfully setting or resuming a connection, when interest is changed, or when the PCell providing the system information including sidelink common configuration information (sl-ConfigCommonNR) is changed, the UE may transmit the sidelink UE information message to the base station. When the preferred parameter for discontinuous reception is changed since the last time of transmission of the sidelink UE information message by the UE, the UE may transmit the sidelink UE information message to the base station.

The sidelink UE information message may include one or more of the sidelink DRX parameter preference information as follows.

Preferred/suggested/requested/expected DRX parameter set index: it means index/identifier information used to identify a specific DRX parameter set in one or more DRX parameter set lists configured with the prior configuration information when out-of-coverage, or indicated/configured through the system information in the RRC idle/RRC inactive RRC state, or indicated/configured through the RRC reconfiguration message in the RRC connected state. The corresponding DRX parameter set may include one or more DRX parameters among the DRX parameters as follows. To that end, the RRC reconfiguration message, system information, or sidelink prior configuration information may include DRX parameter set list information. In the first entry of the DRX parameter set list, the DRX parameter set index value corresponds to 1. In the second entry, the DRX parameter set index value corresponds to 2. A plurality of DRX parameter sets may be indicated or pre-configured in such a manner.

Preferred/suggested/requested/expected sidelink discontinuous reception on-duration timer: it indicates preferred duration information at the start of the DRX cycle in the sidelink Preferred/suggested/requested/expected sidelink DRX inactivity timer: it indicates preferred duration information after PSCCH occasion (or PSCCH period or PSCCH reception time) where the PSCCH indicates new sidelink transmission for the MAC entity.

Preferred/suggested/requested/expected sidelink DRX long cycle/DRX long cycle start offset information.

Preferred/suggested/requested/expected sidelink DRX short cycle information.

Preferred/suggested/requested/expected sidelink DRX short cycle timer: it indicates preferred duration information following a short DRX cycle.

Preferred/suggested/requested/expected sidelink reception discontinuous reception HARQ RTT timer: it indicates preference value information for the minimum duration until reception SCI (or SL grant) for HARQ retransmission is expected by the MAC entity.

Preferred/suggested/requested/expected sidelink transmission discontinuous reception HARQ RTT timer: it indicates the preference value information of the minimum duration until a grant for transmission HARQ retransmission [or SCI (e.g., when scheduled by the UE) or DCI (e.g., when scheduled by the base station] is expected by the MAC entity.

Preferred/suggested/requested/expected sidelink reception discontinuous reception retransmission timer: it indicates the preference value information of the maximum duration until sidelink retransmission is received.

Sidelink transmission discontinuous reception retransmission timer: it indicates the preference value information of the maximum duration until a grant for sidelink retransmission [or SCI (e.g., when scheduled by the UE) or DCI (e.g., when scheduled by the base station] is received.

An Embodiment of Indicating, to the UE, Configuration Information for Configuring to Allow Transmission of Preference Information for the DRX Parameter If any UE transmits the above-described preference message (e.g., a message including the sidelink DRX parameter or message including one or more pieces of information described above, or a message including the sidelink DRX parameter preference information) at any time, or if any UE continuously transmits the above-described message, the base station may have an increasing load and overhead for processing it. Therefore, the base station needs to limit the transmission of the preference message.

As an example, the base station may indicate (e.g., transmit, provide), to the UE, information for configuring to provide preference information about the sidelink DRX parameter to the UE. When the UE (e.g., a UE having the capability of providing preference information about the sidelink DRX parameter) is instructed/requested/permitted/configured to provide preference information about the sidelink DRX parameter, and/or when the preference information about the DRX sidelink parameter is changed, the UE may transmit the preference message to the base station.

As another example, the base station may indicate information for configuring to permit transmission of preference information about the sidelink DRX parameter in the UE to the UE. When it is instructed/requested/configured to permit transmission of the preference information about the sidelink DRX parameter and/or when the preference to the DRX sidelink parameter is changed, the UE (e.g., a UE having the capability of providing preference information about the sidelink DRX parameter) may transmit the corresponding preference message to the base station. The information for configuring to provide the preference information may be indicated through system information for V2X communication or system information for sidelink communication or any system information. Or, the information for configuring to provide the preference information may be indicated through a dedicated RRC message (RRC reconfiguration message).

As another example, when the UE (e.g., a UE having the capability of providing preference information about the sidelink DRX parameter) is instructed/requested/permitted/configured to provide preference to the sidelink DRX parameter, and/or when the preference to the current sidelink DRX parameter differs from that of the last transmission of the message including the preference information about the sidelink DRX parameter, the UE may transmit the preference message to the base station.

As another example, when the UE (e.g., a UE having the capability of providing preference information about the sidelink DRX parameter) is instructed/requested/permitted/configured to provide preference to the sidelink DRX parameter and/or when the UE receives an RRC reconfiguration message (RRC reconfiguration with Sync) including a handover command to execute handover and transmit an RRC reconfiguration complete message, the UE may include the corresponding preference message in the RRC reconfiguration complete message and transmit it to the base station.

An Embodiment of Indicating Timer Information for Prohibiting Transmission of a Message Including the Corresponding Information for a Predetermined Time after Transmitting the Preference Information about the Sidelink DRX Parameter The timer information here may be the above-described preference prohibit timer.

The base station may configure, in the UE, a sidelink DRX preference prohibit timer for instructing to prohibit transmission of the preference message (for a predetermined time) after the UE transmits a message including the preference information about the sidelink DRX parameter. The sidelink DRX preference prohibit timer may be started when transmitting a message including a sidelink DRX parameter. The sidelink DRX preference prohibit timer may be stopped when initiating the RRC connection reconfiguration/resume procedure and when receiving instruction information set to release the corresponding sidelink preference configuration.

If the UE is configured to provide preference information about the sidelink DRX parameter, if the UE has not sent a message containing the information since the UE was configured to provide preference information about the sidelink DRX parameter, or if different from that indicated in the last transmission of the message including the preference information about the sidelink DRX parameter of the UE, and the corresponding prohibit timer is not in operation, the UE sets the timer value to the sidelink DRX preference prohibit timer received from the base station and starts the timer.

The UE may initiate transmission of a message including the preference information about the sidelink DRX parameter.

Hereinafter, details on the sidelink DRX parameter and a signaling method for configuring the sidelink DRX parameter are described.

When the UE is in the RRC connected state or, although the UE is in the RRC idle/RRC inactive state, if the corresponding function is pre-configured or if the DRX is (pre)configured when the base station receives the corresponding system information or specific data or any trigger condition, e.g., a change in any state inside the UE, occurs, the UE's MAC entity may discontinuously receive the PSCCH/SCI for all sidelink carriers (or for all activated sidelink carriers or for all configured sidelink carriers). Otherwise, the MAC entity of the UE may continuously monitor the PSCCH/SCI. The sidelink DRX parameter may include one or more of the following parameters.

Sidelink DRX parameter set index: it means index/identifier information used to identify a specific DRX parameter set in one or more DRX parameter set lists configured with the prior configuration information when out-of-coverage, indicated/configured through the system information in the RRC idle/RRC inactive state, or indicated/configured through the RRC reconfiguration message in the RRC connected state.

The DRX parameter set may include one or more DRX parameters among the DRX parameters as follows. To that end, the RRC reconfiguration message, system information, or sidelink prior configuration information may include DRX parameter set list information. For example, in the first entry of the DRX parameter set list information, the DRX parameter set index value may correspond to 1. In the second entry, the DRX parameter set index value may correspond to 2. A plurality of DRX parameter sets may be indicated or pre-configured in such a manner.

Sidelink discontinuous reception HARQ RTT timer (referred to as drx-HARQ-RTT-TimerSL for convenience of description): it indicates the minimum duration value before SCI (or SL grant) for HARQ retransmission is expected by the MAC entity. The corresponding timer may be operated for each SL HARQ process. This may be a parameter from the viewpoint of the transmitting UE. Or, this may be a parameter from the viewpoint of the receiving UE.

Sidelink discontinuous reception retransmission timer (referred to as drx-RetransmissionTimerSL for convenience of description): it indicates the maximum duration information until sidelink retransmission is received. The corresponding timer may be operated for each SL HARQ process. This may be a parameter from the viewpoint of the transmitting UE. This may be a parameter from the viewpoint of the receiving UE.

Sidelink discontinuous reception on-duration timer: it indicates duration information at the start of the DRX cycle in the sidelink Sidelink discontinuous reception inactivity timer: it indicates duration information after PSCCH occasion (or PSCCH period or PSCCH reception time) where the PSCCH indicates new sidelink transmission for the MAC entity If the UE receives discontinuous reception considering both transmission and reception through the sidelink, the DRX parameter may include the following parameters.

Sidelink reception discontinuous reception HARQ RTT timer (referred to as drx-HARQ-RTT-TimerRX-SL for convenience of description): it indicates minimum duration information until before reception SCI (or SL grant) for HARQ retransmission is expected by the MAC entity. The corresponding timer may be operated for each SL reception HARQ process.

Sidelink reception discontinuous transmission HARQ RTT timer (referred to as drx-HARQ-RTT-TimerTX-SL for convenience of description): indicates minimum duration information until before grant [or SCI (e.g., when scheduled by the UE) or DCI (e.g., when scheduling is allocated by the base station)] for transmission HARQ retransmission is expected by the MAC entity. The corresponding timer may be operated for each SL transmission HARQ process.

Sidelink reception discontinuous reception retransmission timer (referred to as drx-RetransmissionTimerRX-SL for convenience of description): it indicates maximum duration information until sidelink retransmission is received. The corresponding timer may be operated for each SL reception HARQ process.

Sidelink transmission discontinuous retransmission timer (referred to as drx-RetransmissionTimerTX-SL for convenience of description): it indicates maximum duration information until grant [or SCI (e.g., when scheduled by the UE) or DCI (e.g., when scheduling is allocated by the base station)] for sidelink retransmission is received. The corresponding timer may be operated for each SL transmission HARQ process.

Sidelink reception gap timer: it is a timer for turning off PSCCH monitoring during the time gap between initial transmission and retransmission in association with the PSSCH resource allocation information included in the SCI.

An Embodiment in which the Base Station Indicates Sidelink DRX Parameters to the UE for UEs within the Same Base Station Coverage, and the UE Uses the Parameters for Bidirectional PSCCH Transmission/PSCCH Reception It is possible to save UE power consumption by controlling to reduce the UE's physical sidelink control channel (PSCCH) monitoring. The PSCCH may indicate the physical sidelink shared channel (PSSCH) resource and transmission parameter. The PSSCH may include control information for resource allocation for the transport block of data for transmission, transport block for data itself, and HARQ procedure and CSI feedback trigger. The UE transmits sidelink control information (SCI) to the peer UE through the PC5 interface, indicating that there is one transmission on the SL-SCH and providing the relevant HARQ information and information for CSI feedback trigger.

For example, the SCI may be made up of two parts. The SCI include a first stage SCI on the PSCCH and a second stage SCI part on the PSSCH. The first SCI may include one or more pieces of information among the priority, PSSCH resource allocation information (frequency/time resource for PSSCH, e.g. frequency resource location of initial transmission and retransmission, time gap between current transmission and first reserve resource, Time gap between initial transmission and retransmission, time gap between current transmission and second reserve resource), resource reservation information, resource reservation period, PSSCH DMRS pattern, 2nd SCI format, number of PSSCH DMRS port(s), and MCS. The second stage SCI may include one or more pieces of information among HARQ process ID, New data indicator, Redundancy version, Source ID, Destination ID, CSI request, Zone ID, and communication range requirement. Or, common information for all the UEs having different services may be carried in the first stage, and specific information for each service may be carried in the second stage.

As another example, the SCI may be transmitted, as one part, through the PSCCH.

The UE in the RRC connected state (initiating UE) requests a sidelink resource and transmits, to the base station, a sidelink UE information message for reporting QoS information about each destination (e.g., target for sidelink communication). The base station transmits an RRC reconfiguration message to the UE (initiating UE) to indicate the sidelink configuration. The RRC reconfiguration message may include the sidelink DRX parameter for controlling the UE's PSCCH/SCI monitoring activation. The base station may indicate the sidelink DRX parameter to the UE (initiating UE) through the RRC reconfiguration message. The base station may indicate the sidelink DRX parameter to the peer UE of sidelink communication through the RRC reconfiguration message. The sidelink DRX parameter may include index/identifier information for indicating the corresponding DRX parameter set. The corresponding index/identifier information may be indicated through a system information/dedicated RRC message or preconfigured by the base station. The sidelink DRX parameter is described below.

The UE (initiating UE) may discontinuously transmit the PSCCH/SCI using the sidelink DRX parameter received from the base station and discontinuously receive the PSCCH/SCI from the peer UE. Likewise, the peer UE may discontinuously receive the PSCCH/SCI using the sidelink DRX parameter received from the base station and discontinuously transmit the PSCCH/SCI to the initiating UE.

As an example, the sidelink DRX parameter may be indicated through one piece of sidelink DRX configuration information and be used for the UE to receive the PSCCH/SCI from the peer UE and to transmit the PSCCH/SCI to the peer UE. For example, one sidelink DRX configuration may be used for both directions. As another example, the corresponding sidelink DRX parameter may be indicated by two pieces of sidelink DRX configuration information (e.g., a DRX parameter configuration and a DTX parameter configuration, or a reception DRX parameter configuration and a transmission DRX parameter configuration) and be used for the UE to perform PSCCH/SCI reception from the peer UE (e.g., use of the DRX parameter configuration or reception DRX parameter configuration) and PSCCH transmission to the peer UE (e.g., use of the DTX parameter configuration or transmission DRX parameter configuration) by applying different parameter values. For example, a different sidelink DRX configuration may be used for each direction. For convenience of description, the following description is based on one DRX parameter configuration. However, this is only for convenience of description, and applying two DRX parameter configurations in the following embodiments is also included in the scope of the disclosure.

The UE may receive an RRC reconfiguration message from the base station and then transmit the PSCCH/SCI using the received sidelink DRX parameter, and the peer UE may receive an RRC reconfiguration message from the base station and then receive the PSCCH/SCI using the received DRX parameter. However, a PSCCH/SCI reception failure may occur due to a time difference, e.g., a difference in message reception time between the two UEs or a difference in RRC message processing time in the UE.

To address this, as an example, the base station may indicate (e.g., inform, provide, transmit), to the UE, an offset value for matching timings upon PSCCH transmission or PSCCH reception using the sidelink DRX parameter. As an example, the base station may indicate a sidelink DRX slot offset value to indicate a delay before starting the sidelink DRX on-duration timer. As another example, the base station may indicate the SFN/Direct Frame Number/SL frame number/subframe number/slot number where the sidelink (Long/Short) DRX cycle starts. As another example, the base station may indicate the SFN/Direct Frame Number/SL frame number/subframe number/slot number where the sidelink DRX on-duration timer starts. If two DRX parameter configurations (e.g., reception DRX parameter configuration and transmission DRX parameter configuration) are applied, the corresponding parameters may be configured to have the same value matching on the two DRX parameter configurations or have a specific arbitrary relationship (e.g., proportional relationship, linear relationship, or multiple relationship). For example, when one of the reception DRX parameters is configured as 2, one of the corresponding transmission DRX parameters may be selected from among 1, 2, 4, 8, 16, and 32.

As another example, the base station may indicate (e.g., inform, provide, or transmit), to the UE, information for activating/deactivating/enabling/disabling/starting/stopping PSCCH/SCI transmission or PSCCH/SCI reception using the sidelink DRX parameter. The corresponding information may be indicated through an RRC message or MAC control element (CE). The corresponding information may include index/identifier information for indicating the corresponding DRX parameter set. The corresponding information may include one or more pieces of information among a source L2 ID, a destination L2 ID, a UE identifier, a logical channel identifier, frequency configuration information, and transmission/reception identification (e.g., transmission, reception, or transmission/reception). As another example, upon receiving a unicast DRX command MAC CE, one or more of a sidelink DRX duration timer, a sidelink DRX inactivity timer, and a sidelink HARQ round trip time (RTT) timer for the corresponding sidelink DRX configuration may be started. To this end, the MAC CE may include information for instructing to start. As another example, upon receiving a unicast DRX command MAC CE, one or more of a sidelink DRX duration timer, a sidelink DRX inactivity timer, and a sidelink HARQ round trip time (RTT) timer for the corresponding sidelink DRX configuration may be stopped. To this end, the MAC CE may include information for instructing stop. The MAC CE may include an LCID to identify the same. Further, a specific value for source L2 may be designated and used to distinguish broadcast and groupcast types.

An Embodiment of Activating/Instructing Sidelink Operation Through PC5-RRC Message/MAC CE The base station may indicate the sidelink DRX parameter to the UE (initiating UE) through the RRC reconfiguration message. The base station may indicate the sidelink DRX parameter to the peer UE of sidelink communication through the RRC reconfiguration message. The UE/peer UE may store the received sidelink DRX parameter. The UE may transmit, to the peer UE, instruction information for instructing to activate/deactivate/enable/disable/stop PSCCH/SCI transmission or PSCCH/SCI reception using the sidelink DRX parameter. The corresponding instruction information may be transmitted through a PC5-RRC message (e.g., a sidelink RRC reconfiguration message) or MAC CE on a PC5 interface between the UEs.

The corresponding instruction information may include index/identifier information for indicating the corresponding DRX parameter set. The corresponding instruction information may include one or more pieces of information among a source L2 ID, a destination L2 ID, a UE identifier, a logical channel identifier, frequency configuration information, and transmission/reception identification (e.g., transmission, reception, or transmission/reception). The instruction information may be associated with one or more pieces of information among a source L2 ID, a destination L2 ID, a UE identifier, a logical channel identifier, frequency configuration information, and transmission/reception identification (e.g., transmission, reception, or transmission/reception).

Similar to the foregoing, the UE may also receive the above-described instruction information through the sidelink interface from the peer UE. Since the instruction information received by the UE is the same as that described above, it is omitted.

The UE (initiating UE) may discontinuously transmit the PSCCH/SCI using the DRX parameter received from the base station and discontinuously receive the PSCCH/SCI from the peer UE. The peer UE may discontinuously receive the PSCCH/SCI using the DRX parameter received from the base station and discontinuously transmit the PSCCH/SCI to the initiating UE.

An Embodiment of Transmitting Sidelink DRX Parameters Through a PC5-RRC Message (Sidelink Reconfiguration/Reconfiguration Complete)

The UE may include the sidelink DRX parameter in the PC5-RRC message (e.g., sidelink RRC reconfiguration message) on the PC5 interface and transmit it to the peer UE to control the PSCCH/SCI monitoring activity. The PC5-RRC connection represents a logical connection between two UEs for a pair of source L2 ID and destination L2 ID. The connection is considered to be established after the corresponding PC5 unicast link specified in 3GPP TS 23.287 is connected. Accordingly, there is a one-to-one relationship between the PC5 unicast link and the PC5-RRC link. The UE may use a sidelink RRC reconfiguration procedure to configure/instruct the sidelink radio bearer of the peer UE through the PC5 interface.

The UE may include the sidelink DRX parameter in the sidelink RRC reconfiguration message and send it to the peer UE. For example, the sidelink DRX parameter may be configured in association with one or more of a PC5 unicast link, a PC5-RRC connection, a logical connection for a pair of source L2 ID and destination L2 ID, a sidelink radio bearer and a sidelink RLC bearer, sidelink transmission range and cast type. As another example, the sidelink DRX parameter may be UE-specifically indicated and configured. As still another example, the sidelink DRX parameter may be configured in association with one or more of the sidelink frequency, the sidelink carrier, the PC5 link, the sidelink bandwidth part (BWP), and the sidelink resource pool. As further another example, the sidelink DRX parameter may be configured in association with the resource allocation mode (e.g., one or more of the first mode, the second mode, and the simultaneous support mode). As yet another example, the sidelink DRX parameter may be configured in association with one of any sidelink configuration information described below. Here, the PC5 link may be identified by the PC5 link identifier (PC5 Link Identifier: it uniquely identifies the PC5 unicast link in a UE for the lifetime of the PC5 unicast link as specified in TS 23.287. The PC5 Link Identifier is used to indicate the PC5 unicast link whose sidelink RLF declaration was made and PC5-RRC connection was released.)

The base station (NG-RAN) may provide an anchor carrier function to provide intra-carrier/intra-frequency sidelink configuration information, inter-carrier/inter-frequency sidelink configuration information and sidelink configuration to the UE through the Uu carrier on the interface between the UE and the base station for NR sidelink communication and/or V2X sidelink communication.

The sidelink frequency configuration information may include at least one of absolute frequency information about the reference resource block (sl-AbsoluteFrequencyPointA), sidelink SSB absolute frequency information indicating the frequency position of the sidelink SSB (sl-AbsoluteFrequencySSB), sidelink bandwidth part information (sl-BWP-ToAddModList/sl-BWP-ToReleaseList), SCS specific carrier information indicating the position configuration set and UE-specific channel bandwidth for different subcarrier spacings (sl-SCS-SpecificCarrierList) and sidelink sync priority information (sl-SyncPriority).

The sidelink bandwidth part information may include resource pool configuration information (RX pool, TX pool, and TX exceptional pool) on the corresponding BWP.

The sidelink radio bearer configuration information may include at least one of sidelink radio bearer Uu configuration index information (SLRB-Uu-ConfigIndex) used to identify the sidelink DRB configuration (from network/base station), sidelink SDAP configuration information (sl-SDAP-Config) indicating the mapping between the sidelink QoS flow and the sidelink radio bearer, sidelink PDCP configuration information (sl-PDCP-Config) indicating the PDCP parameter for the sidelink radio bearer, and sidelink transmission range information (sl-TransRange) indicating the transmission range of the sidelink radio bearer.

For RLC bearer configuration of the sidelink radio bearer, SL RLC bearer configuration information (SL-RLC-Bearer-Config) may be pre-configured in the UE. The sidelink RLC bearer configuration information may include at least one of the sidelink RLC bearer configuration index information (sl-RLC-BearerConfigIndex) used to identify the RLC bearer configuration, sidelink served radio bearer configuration information (sl-ServedRadioBearer) for associating the RLC bearer to one sidelink radio bearer, sidelink RLC configuration information (SL-RLC-Config) including the sidelink RLC configuration parameter, and sidelink MAC logical channel configuration information (sl-MAC-LogicalChannelConfig) including sidelink logical channel identifier information and/or sidelink logical channel configuration information.

If the UE successfully receives and applies the sidelink RRC reconfiguration message, the peer UE may transmit a sidelink RRC reconfiguration complete message to the UE.

As an example, the UE (initiating UE), receiving the sidelink RRC reconfiguration complete message, may discontinuously transmit the PSCCH/SCI using the transmitted sidelink DRX parameter and discontinuously receive the PSCCH/SCI from the peer UE. The peer UE, transmitting the sidelink RRC reconfiguration complete message, may discontinuously receive the PSCCH/SCI using the received sidelink DRX parameter and discontinuously transmit the PSCCH/SCI to the initiating UE.

As another example, the UE (initiating UE), receiving the sidelink RRC reconfiguration complete message, may discontinuously transmit the PSCCH/SCI using the transmitted sidelink DRX parameter. The peer UE, transmitting the sidelink RRC reconfiguration complete message, may discontinuously receive the PSCCH/SCI using the received sidelink DRX parameter.

As further another example, the peer UE, receiving the DRX parameter through the sidelink RRC reconfiguration message, may include the sidelink DRX parameter in the sidelink RRC reconfiguration complete message and transmit it to the UE (initiating UE). The UE (initiating UE) may discontinuously transmit the PSCCH/SCI using the sidelink DRX parameter transmitted through the sidelink RRC reconfiguration message, and the peer UE may discontinuously receive the PSCCH/SCI from the UE. The peer UE may discontinuously transmit the PSCCH/SCI using the sidelink DRX parameter transmitted through the sidelink RRC reconfiguration complete message, and the UE (initiating UE) may discontinuously receive the PSCCH/SCI.

A Detailed Operation Embodiment when Sidelink DRX Parameter is Received Between UEs The UE may receive the sidelink DRX parameter for performing discontinuous reception on the PC5 interface through the RRC reconfiguration message from the base station in the RRC connected state. The UE may receive the sidelink DRX parameter through the system information from the base station in the RRC idle/RRC inactive RRC state. The UE may pre-configure the sidelink DRX parameter to be used when out of coverage.

The UE may generate a sidelink RRC reconfiguration message including the sidelink DRX parameter by applying/using the pre-configured information when out-of-coverage or system information in the RRC idle/RRC inactive RRC state or RRC reconfiguration message in the RRC connected state. (Regardless of the RRC state) The UE may transmit the sidelink DRX parameter to the counterpart UE (peer UE) through the PC5 interface using the sidelink RRC reconfiguration message.

If the two UEs performing sidelink communication have different parameters, communication may not be properly performed. For example, when the two UEs are in different base station cell coverage, parameters for sidelink communication between the UEs may be indicated with different values. As another example, of the two UEs, one UE may be within coverage and the other UE may be out of coverage. In this case, the parameter value for sidelink communication received from the base station in coverage may be a different value from the parameter value preconfigured in the other UE.

In this case, the following methods may be used.

As an example, the UE receives a sidelink DRX parameter through a sidelink RRC reconfiguration message. If the received sidelink DRX parameter differs from the DRX parameter according to the pre-configured information when out-of-coverage or the system information in the RRC idle/RRC inactive RRC state or the RRC reconfiguration message in the RRC connected state, the UE may regard and handle it as sidelink RRC reconfiguration failure.

If the UE may not follow the configuration included in the sidelink reconfiguration message, the UE may continue using the configuration that it had used before receiving the sidelink RRC reconfiguration message.

The UE submits it to the lower layer to transmit the sidelink RRC reconfiguration failure message. The UE transmits the sidelink RRC reconfiguration failure message (to the counterpart UE).

If the counterpart/peer UE is in the RRC connected state and the counterpart UE receives the sidelink RRC reconfiguration failure message, the counterpart UE transmits a sidelink UE information message to the base station. The sidelink UE information message may include sidelink failure information. For example, the counterpart UE may set the sidelink failure information as a configuration failure for associated destination (or DRX parameter configuration failure or sidelink RLF) and transmit the sidelink UE information message.

As another example, the UE may perform the PSCCH/SCI monitoring activity using the DRX parameter received through the sidelink RRC reconfiguration message. If the sidelink DRX parameter received through the sidelink RRC reconfiguration message differs from the sidelink DRX parameter indicated by the base station or stored/configured in the UE, if the UE is in the RRC connected state, the UE may transmit information thereabout to the base station. For example, the UE may transmit the sidelink DRX parameter to the base station through the sidelink UE information RRC message (about the associated destination).

As further another example, the UE may perform the PSCCH/SCI monitoring activity using the DRX parameter received through the sidelink RRC reconfiguration message. If the sidelink DRX parameter received through the sidelink RRC reconfiguration message differs from the sidelink DRX parameter indicated by the base station or stored/configured in the UE, the UE may transmit a preferred/suggested/expected/requested sidelink DRX parameter to the UE having transmitted the sidelink RRC reconfiguration message. The preferred/suggested/expected/requested sidelink DRX parameter may be included and transmitted in the sidelink RRC reconfiguration complete message.

As still another example, when the RRC connected peer/receiving UE receives the sidelink DRX parameter from the initiating/transmitting UE through a sidelink RRC reconfiguration message, and when no sidelink DRX parameter has been configured in the peer UE, the peer UE may report the DRX parameter received through the sidelink RRC reconfiguration message to the base station.

As yet another example, when the RRC connected peer UE receives the sidelink DRX parameter from the initiating UE through a sidelink RRC reconfiguration message, and when no sidelink DRX parameter has been configured in the peer UE, the peer UE may apply the DRX parameter received through the received sidelink RRC reconfiguration message. For example, the peer UE may perform a DRX operation according to the corresponding DRX parameter.

As further still another example, when the RRC idle/RRC inactive peer UE receives the sidelink DRX parameter from the initiating UE through a sidelink RRC reconfiguration message, and when no sidelink DRX parameter has been configured in the peer UE, the peer UE may apply the DRX parameter received through the sidelink RRC reconfiguration message. For example, the peer UE may perform a DRX operation according to the corresponding DRX parameter.

As further still another example, when the RRC idle/RRC inactive peer UE receives the sidelink DRX parameter from the initiating UE through a sidelink RRC reconfiguration message, and when a sidelink DRX parameter has been configured in the peer UE through the system information (SIB), the peer UE may apply the DRX parameter received through the sidelink RRC reconfiguration message. For example, the peer UE may perform a DRX operation according to the corresponding DRX parameter.

As further still another example, when the RRC idle/RRC inactive peer UE receives the sidelink DRX parameter from the initiating UE through a sidelink RRC reconfiguration message, and when a sidelink DRX parameter has been configured in the peer UE through the system information (SIB), the peer UE may report the DRX parameter received through the sidelink RRC reconfiguration message to the base station.

As further still another example, when the RRC idle/RRC inactive peer UE receives the sidelink DRX parameter from the initiating UE through a sidelink RRC reconfiguration message, and when a sidelink DRX parameter has been configured in the peer UE through the system information (SIB), the peer UE may regard it as a sidelink radio link failure. The peer UE continues using the configuration that it had used before the sidelink RRC reconfiguration message. The peer UE releases the sidelink SRB/DRB for the corresponding destination or all sidelink SRBs/DRBs. The peer UE discards the configuration regarding the sidelink communication for the corresponding destination. The peer UE considers that the sidelink RRC connection (PC5-RRC connection) of the corresponding destination is released. The peer UE instructs to release the PC5-RRC connection for the corresponding destination. The peer UE may transmit information for indicating sidelink radio link failure to the counterpart/initiating UE. The peer UE may report it to the base station. The information reported to the base station may be transferred through the sidelink UE information message.

As further still another example, when the out-of-coverage peer UE receives the sidelink DRX parameter from the initiating UE through a sidelink RRC reconfiguration message, and when no sidelink DRX parameter has been configured in the peer UE, the peer UE may apply the DRX parameter received through the sidelink RRC reconfiguration message. For example, the peer UE may perform a DRX operation according to the corresponding DRX parameter.

As further still another example, when the out-of-coverage peer UE receives the sidelink DRX parameter from the initiating UE through a sidelink RRC reconfiguration message, and when a sidelink DRX parameter indicated by the base station is configured in the peer UE, if the values differ, the peer UE may regard it as a sidelink radio link failure. The peer UE continues using the configuration that it had used before the sidelink RRC reconfiguration message. The peer UE releases the sidelink SRB/DRB for the corresponding destination or all sidelink SRBs/DRBs. The peer UE discards the configuration regarding the sidelink communication for the corresponding destination. The peer UE considers that the sidelink RRC connection (PC5-RRC connection) of the corresponding destination is released. The peer UE instructs to release the PC5-RRC connection for the corresponding destination. The peer UE may transmit information for indicating sidelink radio link failure to the counterpart/initiating UE.

As described above, according to the embodiments, it is possible to control to perform sidelink communication between UEs in a power efficient manner.

Hereinafter, hardware and software configurations of a UE and a base station capable of performing the above-described embodiments will be again briefly described below with reference to the drawings.

Figure 11:
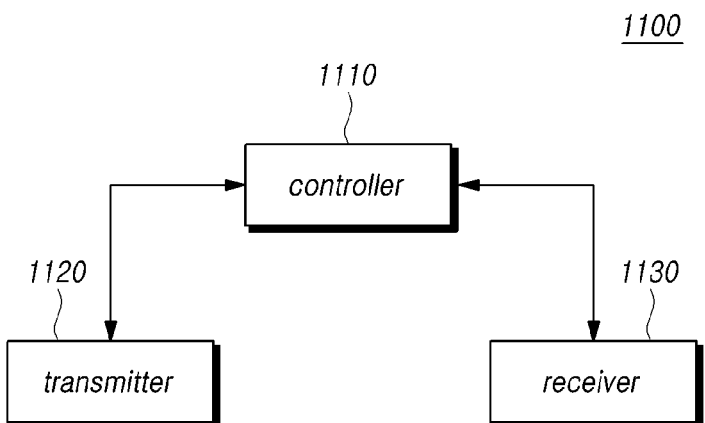
FIG. 11 is a block diagram for describing a configuration of a UE according to an embodiment.

FIG. 11 is a block diagram showing a UE according to an embodiment.

Referring to FIG. 11, a UE 1100 performing sidelink communication includes a receiver 1130 receiving configuration information for controlling transmission of sidelink discontinuous reception (DRX) parameter preference information from a base station or another UE, a controller 1110 configuring a transmission operation of the sidelink DRX parameter preference information based on the configuration information, and a transmitter 1120 transmitting the sidelink DRX parameter preference information to the base station or the other UE based on the configuration information.

The receiver 1130 may receive various messages from a base station or another UE performing sidelink communication. The received message may be received through various channels, e.g., through a Uu interface in the case of the base station and through a sidelink interface (e.g., PC5) in the case of the other UE.

According to an embodiment, the configuration information may include information for configuring transmission of preference information about the sidelink DRX parameter preferred by the UE when the UE performs a sidelink DRX operation. For example, the configuration information may include preference prohibit timer information about sidelink DRX parameter preference information transmission. Or, the configuration information may include various pieces of information, such as trigger condition information used for the UE to transmit sidelink DRX parameter preference information, type of information to be included in the sidelink DRX parameter preference information, and information as to whether sidelink DRX parameter preference information transmission is activated.

Further, the controller 1110 configures the received configuration information in the UE. According to an embodiment, the controller 1110 may configure a preference prohibit timer for sidelink DRX parameter preference information transmission included in the configuration information, in the UE.

Further, the controller 1110 may set the preference prohibit timer to initiate when the sidelink DRX parameter preference information selected by the UE differs from the sidelink DRX parameter preference information included in the most recently transmitted RRC message, and the sidelink preference prohibit timer configured in the UE does not operate.

The transmitter 1120 may transmit an RRC message to the base station or another UE. In this case, the RRC message may include sidelink DRX parameter preference information. Thereafter, the controller 1110 determines whether the sidelink DRX parameter preference information transmitted through the RRC message is changed for an arbitrary reason of the UE. If the sidelink DRX parameter preference information transmitted most recently by the UE and the sidelink DRX parameter preference information currently selected by the UE have been changed, the controller 1110 determines whether the preference prohibit timer is operating. When the preference prohibit timer is not operating, the controller 1110 may initiate the preference prohibit timer received through the configuration information.

If a transmission trigger in the UE, configured based on the configuration information, occurs, the transmitter 1120 may transmit sidelink DRX parameter preference information to the base station or another UE. In this case, the sidelink DRX parameter preference information may be transmitted through a sidelink UE information RRC message or UE assistance information RRC message.

According to an embodiment, the sidelink DRX parameter preference information may include at least one of the UE's preference sidelink DRX cycle information, preference sidelink DRX inactivity timer information, and preference sidelink DRX on-duration timer information. The sidelink DRX parameter preference information may further include other various preference parameter information described in the disclosure.

Further, the controller 1110 controls the overall operation of the UE 1100 according to sidelink DRX parameter transmission/reception and DRX control operations necessary for performing the above-described embodiments.

The transmitter 1120 and the receiver 1130 are used to transmit or receive signals or messages or data necessary for performing the above-described embodiments, with the base station or another UE.

Figure 12:
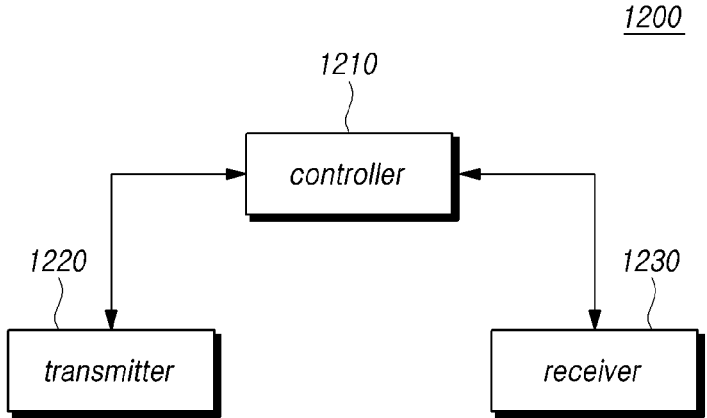
FIG. 12 is a block diagram for describing a configuration of a base station according to an embodiment.

FIG. 12 is a block diagram showing a base station according to an embodiment.

Referring to FIG. 12, a base station 1200 controlling sidelink communication of a UE includes a transmitter 1220 transmitting configuration information for controlling transmission of sidelink discontinuous reception (DRX) parameter preference information to the UE and a receiver 1230 receiving the sidelink DRX parameter preference information from the UE. The transmitter 1220 may further transmit the sidelink DRX configuration information including the sidelink DRX parameter information to be used for the UE's sidelink communication based on the sidelink DRX parameter preference information.

According to an embodiment, the configuration information may include information for configuring transmission of preference information about the sidelink DRX parameter preferred by the UE when the UE performs a sidelink DRX operation. For example, the configuration information may include preference prohibit timer information about sidelink DRX parameter preference information transmission. Or, the configuration information may include various pieces of information, such as trigger condition information used for the UE to transmit sidelink DRX parameter preference information, type of information to be included in the sidelink DRX parameter preference information, and information as to whether sidelink DRX parameter preference information transmission is activated.

The UE configures the received configuration information in the UE. According to an embodiment, the UE may configure a preference prohibit timer for sidelink DRX parameter preference information transmission included in the configuration information, in the UE. Further, the UE may set the preference prohibit timer to initiate when the sidelink DRX parameter preference information selected by the UE differs from the sidelink DRX parameter preference information included in the most recently transmitted RRC message, and the sidelink preference prohibit timer configured in the UE does not operate.

The UE may transmit the sidelink DRX parameter preference information to the base station based on the configured configuration information. As described above, the UE may also transmit sidelink DRX parameter preference information to another UE performing sidelink communication.

According to an embodiment, the receiver 1230 may receive the sidelink DRX parameter preference information through a sidelink UE information RRC message or UE assistance information RRC message. For example, the sidelink DRX parameter preference information may include at least one of the UE's preference sidelink DRX cycle information, preference sidelink DRX inactivity timer information, and preference sidelink DRX on-duration timer information. The sidelink DRX parameter preference information may further include other various preference parameter information described in the disclosure.

The transmitter 1220 may transmit the sidelink DRX configuration information to perform a DRX operation in the sidelink communication. The sidelink DRX configuration information may include various sidelink DRX parameter information necessary for the UE to perform the DRX operation in the sidelink communication. The sidelink DRX configuration information may include two or more sidelink DRX parameter sets and, in this case, may include index information for distinguishing the sidelink DRX parameter sets.

For example, the sidelink DRX parameter may be configured in association with one or more of a PC5 unicast link, a PC5-RRC connection, a logical connection for a pair of source L2 ID and destination L2 ID, a sidelink radio bearer, and a sidelink RLC bearer.

Further, the controller 1210 controls the overall operation of the base station 1200 according to sidelink DRX parameter transmission and DRX control operation control of the UE necessary for performing the above-described embodiments.

The transmitter 1220 and the receiver 1230 are used to transmit or receive signals or messages or data necessary for performing the above-described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for performing sidelink communication by a user equipment (UE), the method comprising:
   transmitting sidelink discontinuous reception (DRX) parameter preference information to another UE;
   receiving sidelink DRX configuration information from the another UE; and
   transmitting the sidelink DRX configuration information to a base station,
   wherein the sidelink DRX configuration information includes at least one sidelink DRX parameter set configured for sidelink transmission and at least one sidelink DRX parameter set configured for sidelink reception, the transmission and reception parameter sets being separately defined and distinguishable from each other,
   wherein the method further comprises transmitting, to the another UE, a sidelink RRC message including information indicating that the sidelink DRX configuration information cannot be followed when the sidelink DRX configuration information cannot be followed, and
   wherein the information indicating that the sidelink DRX configuration information cannot be followed is transferred to a base station by the another UE.

2. The method of claim 1, wherein the sidelink DRX configuration information is configured in association with a logical connection for a pair of source L2 ID and destination L2 ID.

3. The method of claim 1, wherein the sidelink DRX parameter preference information includes at least one of the UE's preference sidelink DRX cycle information, preference sidelink DRX cycle start offset information, and preference sidelink DRX on-duration timer information.

4. The method of claim 1, wherein the sidelink DRX configuration information is received through a sidelink RRC reconfiguration message.

5. A method of performing sidelink communication by another user equipment (UE), comprising:
   receiving sidelink discontinuous reception (DRX) parameter preference information from a UE;
   transmitting sidelink DRX configuration information to the UE; and
   receiving a sidelink radio resource control (RRC) message including information indicating that the sidelink DRX configuration information cannot be followed, from the UE,
   wherein the sidelink DRX configuration information includes at least one sidelink DRX parameter set configured for sidelink transmission and at least one sidelink DRX parameter set configured for sidelink reception, the transmission and reception parameter sets being separately defined and distinguishable from each other,
   wherein the method further comprises transmitting, to a base station, information indicating that the sidelink DRX configuration information cannot be followed when the sidelink DRX configuration information cannot be followed.

6. The method of claim 5, wherein the sidelink DRX configuration information is configured in association with a logical connection for a pair of source L2 ID and destination L2 ID.

7. The method of claim 5, wherein the sidelink DRX parameter preference information includes at least one of the UE's preference sidelink DRX cycle information, preference sidelink DRX cycle start offset information, and preference sidelink DRX on-duration timer information'.

8. The method of claim 5, wherein the sidelink DRX configuration information is transmitted through a sidelink RRC reconfiguration message.

9. A user equipment (UE) for performing sidelink communication, the UE comprising:
   a transmitter configured to transmit sidelink discontinuous reception (DRX) parameter preference information to another UE; and
   a receiver configured to receive sidelink DRX configuration information from the another UE,
   wherein the transmitter transmits the sidelink DRX configuration information to a base station, and wherein the sidelink DRX configuration information includes at least one sidelink DRX parameter set configured for sidelink transmission and at least one sidelink DRX parameter set configured for sidelink reception, the transmission and reception parameter sets being separately defined and distinguishable from each other, wherein the transmitter transmits, to the another UE, a sidelink RRC message including information indicating that the sidelink DRX configuration information cannot be followed when the sidelink DRX configuration information cannot be followed, and wherein the information indicating that the sidelink DRX configuration information cannot be followed is transferred to a base station by the another UE.

10. The UE of claim 9, wherein the sidelink DRX configuration information is configured in association with a logical connection for a pair of source L2 ID and destination L2 ID.

11. The UE of claim 9, wherein the sidelink DRX parameter preference information includes at least one of the UE's preference sidelink DRX cycle information, preference sidelink DRX cycle start offset information, and preference sidelink DRX on-duration timer information.

12. The UE of claim 9, wherein the sidelink DRX configuration information is received through a sidelink radio resource control (RRC) reconfiguration message.

* * * * *